(12) United States Patent
Pesa

(10) Patent No.: US 12,246,732 B2
(45) Date of Patent: Mar. 11, 2025

(54) VEHICLE PREPARATION BASED ON ENVIRONMENTAL DATA

(71) Applicant: BlackBerry Limited, Waterloo (CA)

(72) Inventor: Aaron Humphrey Pesa, Ottawa (CA)

(73) Assignee: BlackBerry Limited, Waterloo (CA)

( * ) Notice: Subject to any disclaimer, the term of this patent is extended or adjusted under 35 U.S.C. 154(b) by 249 days.

(21) Appl. No.: 17/654,842

(22) Filed: Mar. 15, 2022

(65) Prior Publication Data

US 2023/0294713 A1 Sep. 21, 2023

(51) Int. Cl.
*B60W 60/00* (2020.01)
*B60S 1/02* (2006.01)
*B60W 50/00* (2006.01)

(52) U.S. Cl.
CPC ......... *B60W 50/0098* (2013.01); *B60S 1/026* (2013.01); *B60W 60/001* (2020.02); *B60W 2050/0075* (2013.01); *B60W 2420/403* (2013.01); *B60W 2555/20* (2020.02)

(58) Field of Classification Search
None
See application file for complete search history.

(56) References Cited

U.S. PATENT DOCUMENTS

| | | | |
|---|---|---|---|
| 8,527,146 B1 * | 9/2013 | Jackson | B60W 50/0098 180/287 |
| 11,001,231 B1 * | 5/2021 | Hedman | G06T 7/593 |
| 2015/0283914 A1 | 10/2015 | Malone et al. | |
| 2017/0253201 A1 | 9/2017 | Maeshiro | |
| 2018/0022317 A1 | 1/2018 | Hakeem et al. | |
| 2019/0202463 A1 * | 7/2019 | Anderson | B60W 40/02 |
| 2021/0229686 A1 | 7/2021 | Braley et al. | |
| 2022/0089189 A1 * | 3/2022 | Pandit | G01C 21/3691 |
| 2022/0153227 A1 * | 5/2022 | Srivastava | B60R 25/31 |
| 2022/0205794 A1 * | 6/2022 | Friedman | G06V 20/56 |
| 2023/0196212 A1 * | 6/2023 | Gerrese | G08G 1/202 |
| 2024/0013334 A1 * | 1/2024 | Jang | G08G 1/133 |

OTHER PUBLICATIONS

European Patent Office, Extended European Search Report for Appl. No. 23153676.4 dated Oct. 27, 2023 (16 pages).
Adam Gavine, Vehicle Dynamics International, Amazon and BlackBerry co-develop intelligent vehicle data platform, Jan. 7, 2021 (3 pages).
Mifsud et al., AWS for Industries, AWS and BlackBerry QNX join forces to accelerate auto innovation with BlackBerry IVY, a new intelligent vehicle data platform, Dec. 1, 2020 (3 pages).
Brad Bennett, BlackBerry wants its new IVY platform to be every vehicle's translation layer, Jan. 5, 2022 (5 pages).
European Patent Office, Partial European Search Report for Appl. No. 23153676.4 dated Jul. 24, 2023 (18 pages).
Canadian Patent Office, Office Action for Appl. No. 3,177,565 dated Mar. 20, 2024 (9 pages).

* cited by examiner

*Primary Examiner* — James M McPherson
(74) *Attorney, Agent, or Firm* — Trop Pruner & Hu, P.C.

(57) ABSTRACT

In some examples, a system receives data relating to an environment of a vehicle. Based on the received data, the system initiates a vehicle preparation action by actuating an adjustable component of the vehicle, the vehicle preparation action to ready the vehicle for a user prior to operation of the vehicle.

20 Claims, 3 Drawing Sheets

VEHICLE PREPARATION BASED ON ENVIRONMENTAL DATA

BACKGROUND

Vehicles can be operated in various different environments, such as under different weather conditions, in different geographical locations, and so forth. For example, in the summer, after a vehicle has been parked for a relatively long period of time, the interior of the vehicle can get very hot, make it uncomfortable for drivers and passengers when they enter the vehicle. On the other hand, in cold weather, the interior of the vehicle can become quite cold. Also, after a rainstorm, puddles can form around a vehicle that can make getting in and out of the vehicle difficult without a user's feet getting wet.

BRIEF DESCRIPTION OF THE DRAWINGS

Some implementations of the present disclosure are described with respect to the following figures.

Figure 1:
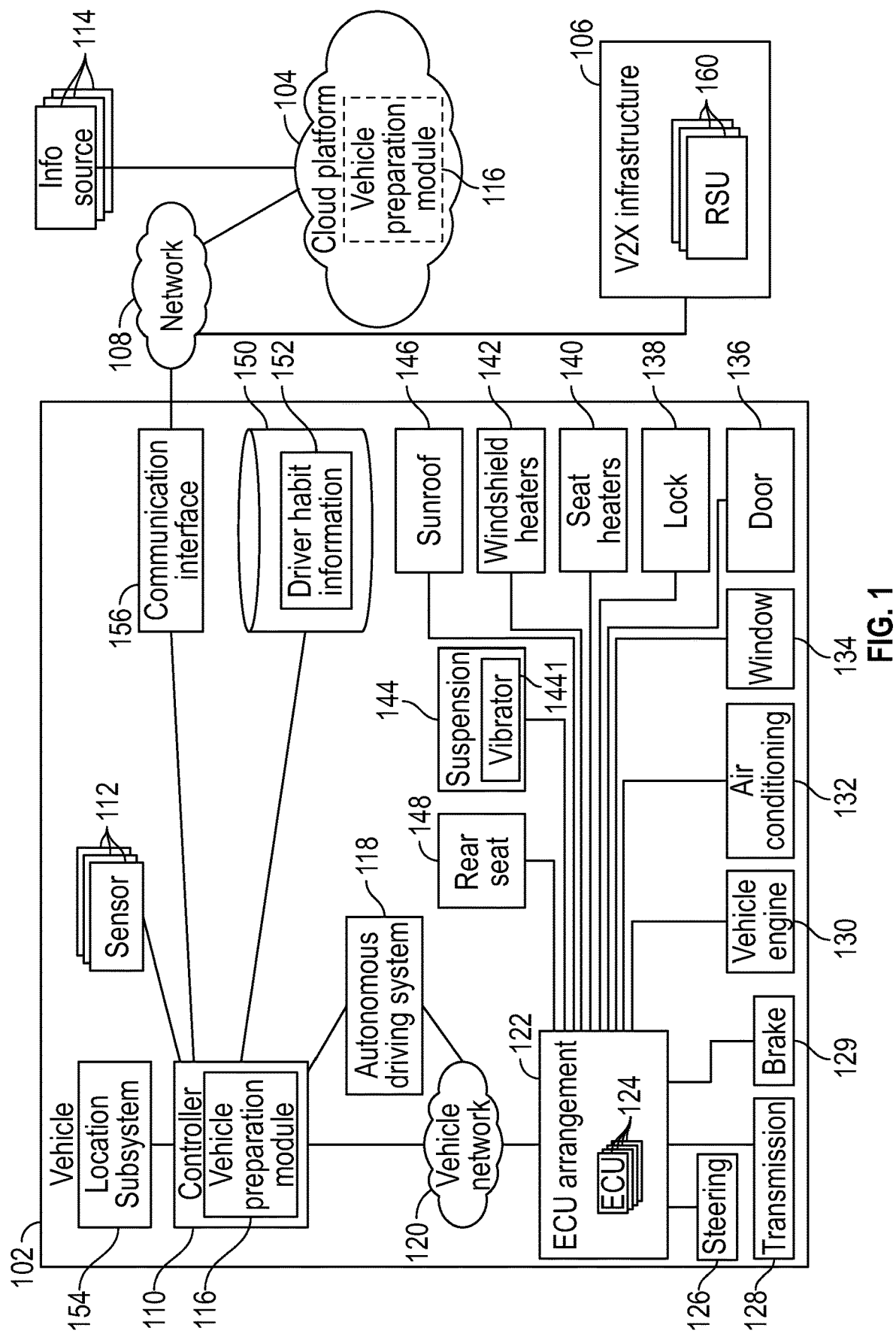
FIG. 1 is a block diagram of an example arrangement including a vehicle according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Examples of vehicles include motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., space planes, space shuttles, space capsules, space stations, satellites, etc.), watercraft (e.g., ships, boats, hovercraft, submarines, etc.), railed vehicles (e.g., trains and trams, etc.), bicycles and other types of vehicles including any combinations of any of the foregoing, whether currently existing or after arising.

User comfort and/or convenience may be impacted under different environmental conditions associated with operations of vehicles. The interior of the vehicle can either get too hot or too cold in different weather conditions. Water puddles formed around the vehicle can make getting into or out of the vehicle difficult. Snow or ice accumulated on the vehicle can cover the windshield and windows, which a user would have to spend a lot of time to remove. The vehicle may be parked in a location, such as a parking lot, that is difficult to get to or that may involve walking through an unsafe neighborhood to get to.

FIG. 1 is a block diagram of an example arrangement that includes a vehicle 102, a cloud platform 104, and a vehicle-to-everything (V2X) infrastructure 106.

A "cloud platform" (or "computing cloud") can refer to an arrangement of computing resources that is accessible over a network by various entities. The computing resources can include computers, communication resources, storage resources, and so forth.

V2X is a feature that provides for communication of information from a vehicle to other entities (and vice versa) that may affect the vehicle and/or the other entities. V2X includes one or more of a subset of features, including communication of a vehicle to/from any or some combination of the following: other vehicles (vehicle-to-vehicle or V2V communication); an infrastructure, e.g., roadside units or RSUs (vehicle-to-infrastructure or V2I communication); a pedestrian (vehicle-to-pedestrian or V2P communication); a network (vehicle-to-network or V2N communication); a device, e.g., an electronic device within the vehicle (vehicle-to-device or V2D communication), an electricity grid (vehicle-to-grid or V2G communication); and so forth.

Networks that support V2X communication can include a cellular network or another type of wireless network. An example cellular network can operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, other types of cellular networks can be employed, such as second generation (2G) or third generation (3G) cellular networks, e.g., a Global System for Mobile (GSM) cellular network, an Enhanced Data rates for GSM Evolution (EDGE) cellular network, a Universal Terrestrial Radio Access Network (UTRAN), a Code Division Multiple Access (CDMA) 2000 cellular network, and so forth. In further examples, cellular networks can be fifth generation (5G) or beyond cellular networks.

Other types of wireless networks can include a wireless local area network (WLAN) that operates according to the Institute of Electrical and Electronics Engineers (IEEE) 802.11 standards (e.g. Dedicated Short Range Communication (DSRC)), IEEE 802.11p standards, an Integrated Digital Enhanced Network (iDEN), and so forth.

A V2X endpoint device refers to an electronic device that is able to participate in a V2X communication. A V2X endpoint device can include a vehicle (such as the vehicle 102), an electronic device (e.g., a desktop computer, a notebook computer, a tablet computer, a smartphone, a wearable device, a game appliance, etc.), a roadside unit (RSU) (which refers to any equipment that is provided on a road, on the side of a road, or in proximity to a road, such as for example, a traffic light, an electronic sign, a toll booth, or any other type of structure), a network node in a network, equipment in an electricity grid, and so forth.

The vehicle 102, the cloud platform 104, and that V2X infrastructure 106 can be coupled to one another over a network 108. Note that the network 108 can include a wired network and/or a wireless network, such as any of the networks listed above.

The vehicle 102 includes a controller 110 that can perform various control tasks in the vehicle 102. Although referred to in the singular sense, note that "controller" can refer to multiple controllers.

As used here, a "controller" can refer to a hardware processing circuit, which can include any or some combination of a microprocessor, a core of a multi-core microprocessor, a microcontroller, a programmable integrated circuit, a programmable gate array, or another hardware processing circuit. Alternatively, a "controller" can refer to a combination of a hardware processing circuit and machine-readable instructions (software and/or firmware) executable on the hardware processing circuit.

In some examples, the controller 110 can include a cloud-connected software platform that can control various operations of the vehicle 102 based on sensor data, including sensor data from vehicle sensors 112 and/or sensor information from sensors outside the vehicle 102.

Examples of the vehicle sensors 112 can include a temperature sensor to detect a temperature within the vehicle 102 and/or a temperature outside the vehicle 102. The vehicle sensors 112 can also detect whether snow has accumulated on the vehicle 102, and/or whether ice has accumulated on the vehicle 102. Other types of vehicle sensors 112 can also be present.

The controller 110 can also receive information from other information sources 114. In some examples, the information sources 114 can be coupled to the cloud platform 104, which can receive information from the information sources 114 and provide the information in a secure manner to the controller 110 over the network 108. For example, the controller 110 and the cloud platform 104 can establish a secure channel over the network 108 using any of various different security protocols.

In other examples, the controller 110 can receive information from information sources 114 over the network 108 without information of the information sources 114 passing through the cloud platform 104.

Examples of the information sources 114 can include a weather data source, such as a weather website or other source of weather data. Weather data can include data regarding rain, snow, wind, temperature, and so forth, of various different geographic locations. Another information source 114 can include a source of map data that provides a map of geographic locations. The map data can include data of roads and highways, as well as data regarding retail outlets, parks, parking lots, and so forth. In other examples, an information source that can include map information can already be part of the vehicle 102, such as a navigation system of the vehicle 102.

In some examples, at least some of the information sources 114 provide web-based data, which is data served from a web server.

In accordance with some implementations of the present disclosure, the controller 110 includes a vehicle preparation module 116, which can perform various vehicle preparation tasks to enhance user comfort and/or convenience. The vehicle preparation module 116 can be implemented using a portion of the hardware processing circuit of the controller 110, or alternatively, can be implemented as machine-readable instructions (software and/or firmware) executable by the controller 110.

In other examples, instead of implementing the vehicle preparation module 116 in the vehicle 102, the vehicle preparation module 116 can be implemented externally of the vehicle 102, such as in the cloud platform 104 or another system. FIG. 1 depicts a vehicle preparation module 116 in dashed profile in the cloud platform 104.

In accordance with some examples of the present disclosure, the vehicle preparation module 116 receives data relating to an environment of the vehicle 102. The received data can be from the vehicle sensors 112 and/or the information sources 114, and/or from other sources. Based on the received data, the vehicle preparation module 116 can initiate a vehicle preparation action by actuating an adjustable component of the vehicle 102. The vehicle preparation action is performed to ready the vehicle 102 for a user prior to operation of the vehicle 102.

Examples of received data and vehicle preparation actions are discussed further below.

The controller 110 is connected to various components of the vehicle 102, including an autonomous driving system 118 that is able to perform autonomous driving of the vehicle 102. The autonomous driving system 118 can include one or more processors and machine-readable instructions (software and/or firmware) executable on the one or more processors to perform various tasks relating to autonomous driving of the vehicle 102, including determining a route to take from an origin to a destination, operation of a vehicle engine 130, a steering subsystem 126, a transmission subsystem 128, a brake subsystem 129, etc., of the vehicle 102 to drive the vehicle 102 autonomously without input from a human. The autonomous driving system 118 can also use cameras and/or other sensors of the vehicle 102 to detect traffic on the road and other objects to avoid (such as pedestrians, signs, etc.). Also, the cameras and/or other sensors of the vehicle 102 can be used by the autonomous driving system 118 to detect the current state of a traffic light (e.g., red, yellow, or green), and the autonomous driving system 118 can take appropriate action accordingly (e.g., come to a stop at an intersection or proceed through the intersection). The cameras and/or other sensors of the vehicle 102 can be used by the autonomous driving system 118 to detect presence of a stop sign at an intersection.

The controller 110 is also connected to a vehicle network 120, to which can be connected various other subsystems of the vehicle 102. The autonomous driving system 118 can also be connected to the vehicle network 120.

In some examples, the vehicle network 120 can include a wired network, such as a local area network (LAN) or another type of wired network. In other examples, the vehicle network 120 can instead or additionally include a wireless network, such as a wireless local area network (WLAN).

In some examples, an electronic control unit (ECU) arrangement 122 that includes multiple ECUs 124 can be connected to the vehicle network 120. An "ECU" can refer to a control module, implemented using a hardware processing circuit and/or machine-readable instructions to perform specified control tasks in the vehicle 102.

The ECUs 124 can be dispersed at various locations throughout the vehicle 102. Each ECU can be connected to one or more adjustable components of the vehicle 102. The combination of an ECU and the one or more adjustable components of the vehicle 102 the ECU controls can be referred to as a "controllable subsystem" in the vehicle 102. In some examples, the controller 110 and/or the autonomous driving system 118 can send commands, messages, information elements, etc., over the vehicle network 120 to target ECUs 124 to control respective adjustable components.

Examples of adjustable components in the vehicle 102 include the steering subsystem 126 (that is adjustable to steer the vehicle 102 in a target direction), the transmission subsystem 128 (that couples power of the vehicle engine 130 to the wheels of the vehicle 102, and which is adjustable to deliver varying amounts of power to the wheels), the brake subsystem 129 (including brakes that can be actuated to slow down or stop the vehicle) the vehicle engine 130 (which produces power to set the vehicle 102 in motion, and which can include either gas-powered engine and/or a battery-powered engine and/or an engine powered by another source such as hydrogen), an air conditioning subsystem 132 (to cool or heat the interior space of the vehicle 102 by delivering cooling air or heated air), windows 134 (which can be opened or closed), doors 136 (which can be opened or closed), door locks 138 (which can be actuated between locked and unlocked positions to lock or unlock the doors 136), seat heaters 140 (to warm seats on which the driver and/or passengers sit), windshield heaters 142 (to heat the front windshield and/or the rear windshield), a suspension subsystem 144 (that supports the frame of the vehicle 102 on the wheels of the vehicle 102 and which can be controlled to raise or lower the vehicle 102 with respect to the wheels of the vehicle 102), a sunroof 146 (which can be opened or closed), a rear seat 148, and so forth.

In some examples, the suspension subsystem 144 can include a vibrator 144I that when actuated can cause shaking of the vehicle 102 (e.g., by quickly raising the vehicle 102 up and down, and/or quickly moving the vehicle 102 side to side, and/or quickly moving the vehicle 102 front and back).

The rear seat 148 can be adjustable for different purposes. For example, the rear seat 148 can be folded down under control of the controller 110 to increase the cargo space in the rear of the vehicle. As another example, buckles of the rear seat 148 can be adjusted to allow attachment to a child seat.

The controller 110 is also coupled to a storage 150, which can be implemented using one or more storage devices, such as a disk-based storage device, a solid-state drive (SSD), a memory device, and so forth.

In some examples, the controller 110 (or another automated entity in the vehicle 102 or an entity outside the vehicle 102) can collect information regarding habits (represented as "driver habit information 152" in FIG. 1) of one or more drivers of the vehicle 102. The driver habit information 152 can include time ranges when the driver typically operates the vehicle 102, such as during the morning when the driver drives from home to the office, and during the afternoon when the driver returns from the office back home. The driver habit information 152 can also include information about typical routes taken by the driver at different times, different days of the week, and so forth. The driver habit information 152 can also include information about places that the driver typically visits, such as to drop off children at school, the office location, dining locations, and so forth.

The vehicle 102 further includes a location subsystem 154 that can be used to determine the location of the vehicle 102. For example, the location subsystem 154 can include a satellite-based location subsystem in which a receiver communicates with satellites to determine the location of the vehicle 102. In some examples, such a receiver is referred to as a global positioning system (GPS) receiver that can communicate with GPS satellites. In other examples, the location subsystem 154 can derive the location of the vehicle 102 from other information sources, such as from cellular towers, and so forth.

The vehicle 102 also includes a communication interface 156 that allows the vehicle 102 to communicate over the network 108. The communication interface 156 can include a transceiver to transmit and receive signals over the network 108, as well as protocol layers that govern protocols of data communications over the network 108. Examples of the protocol layers can include a Medium Access Control (MAC) layer, an Internet Protocol (IP) layer, and higher level layers (including those that govern wireless communications according to wireless standards).

The V2X infrastructure 106 can include RSUs 160. Examples of RSUs 160 can include a traffic light, an electronic sign, a toll booth, or any equipment that is provided on a road, on the side of a road, or in proximity to a road. An RSU 160 is able to communicate over the network 108, such as to perform V2X communications with the vehicle 102 or another V2X endpoint. In some examples, an RSU 160 can also communicate over the network 108 with the cloud platform 104, such as to receive certain information from the information sources 114.

Figure 2:
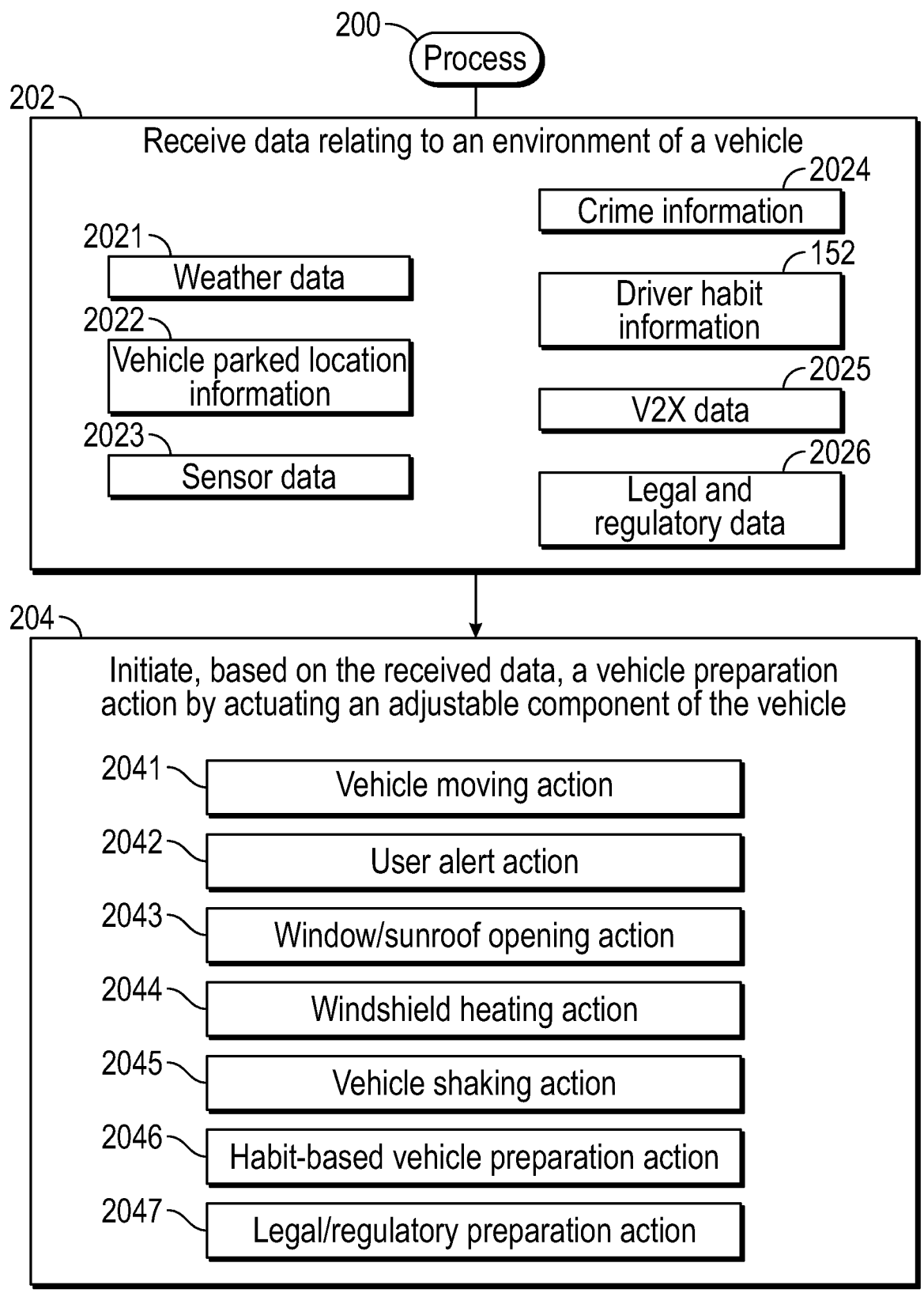
FIG. 2 is a flow diagram of a process of preparing a vehicle according to some examples.

FIG. 2 is a flow diagram of a process 200 according to some examples, which can be performed by the vehicle preparation module 116 that is in the vehicle 102 or in a system remote from the vehicle 102 (such as in the cloud platform 104).

The process 200 includes receiving (at 202) data relating to an environment of a vehicle (e.g., 102 in FIG. 1). The "environment" of the vehicle can include an interior space of the vehicle and/or an outside space that is exterior of the vehicle.

The received data can be from a source on a network, such as one or more information sources 114 in FIG. 1. For example, the received data from the one or more information sources 114 can include weather data 2021 (e.g., from a weather website). As another example, the received data can include vehicle parked location information 2022 regarding a location at which the vehicle is parked, which can be based on map data defining a map of geographic locations and on a current location of the vehicle determined using the location subsystem 154. As a further example, the received data includes sensor data 2023 from a sensor (e.g., 112 in FIG. 1) of the vehicle, such as a temperature sensor that provides a temperature of an interior space and/or an outside space of the vehicle 102.

The sensor data 2023 can also indicate whether snow or ice is covering the windshield. For example, a camera or another type of optical sensor directed from inside the vehicle to outside the vehicle can detect whether visibility through the front windshield, rear windshield, and/or side windows is blocked (either partially or completely). A layer of snow or ice (or even mud or other type of layer) can prevent light from passing through the windshield or window, and may even reflect light back into the interior of the vehicle. The reflected light can indicate that the windshield or window is covered with a layer that affects visibility. As another example, a layer on the windshield or window can prevent a camera from capturing an image of the outside space of the vehicle. Instead of an image of the outside space of the vehicle, the camera would instead capture a consistently opaque layer that indicates visibility blockage.

As yet another example, the sensor data 2023 can also indicate whether puddles have formed around the vehicle. For example, camera(s) on the vehicle directed at ground locations near the doors of the vehicle can capture images of such ground locations to detect presence of water puddles. The captured images can be processed by an image processing program (e.g., executed by the controller 110, a processor of the vehicle 102, or a system external of the vehicle) to determine whether a water puddle is present at a ground location near a door of the vehicle.

As a further example, the received data can include crime information 2024 from an information source 114. The crime information 2024 can identify regions with high crime statistics.

As yet another example, the received data can include the driver habit information 152.

As yet a further example, the received data can include V2X data 2025 from the V2X infrastructure 106, such as from an RSU 160. In some examples, the cloud platform 104 can pass information received from an information source 114 to an RSU 160, which in turn can forward the information to the vehicle 102.

In other examples, the received data can include legal and regulatory data 2026, which can include information regarding an insurance status of the vehicle (e.g., whether or not the vehicle is currently covered by insurance), information regarding whether or not the vehicle is stolen, traffic rules of a geographical region in which the vehicle is located, and so forth. The legal and regulatory data 2026 can be from one or more of the information sources 114, such as an insurance database, a government database, a police database, and so forth.

The process 200 includes initiating (at 204), based on the received data, a vehicle preparation action (prior to operation of the vehicle by the user) by actuating an adjustable component of the vehicle. The vehicle preparation action is performed to ready the vehicle for a user prior to operation of the vehicle.

As an example, a vehicle preparation action includes a vehicle moving action 2041 that moves the vehicle autonomously prior to a user arriving at the vehicle. For example, the vehicle moving action 2041 may move the vehicle from a parked location (e.g., in a parking lot or on the street) indicated by the vehicle parked location information 2022 to where the user is located (e.g., a retail outlet, a restaurant, a bar, etc.). In such examples, the controller 110 in the vehicle can receive information of a current location of the user, such as from a smartphone or smartwatch on the user, and the controller 110 can provide the current location of the user to the autonomous driving system 118. The autonomous driving system 118 can in turn autonomously drive the vehicle to the user's current location.

In a more specific example, the controller 110 can trigger the autonomous driving system 118 to move the vehicle from a parked location of the vehicle in response to the received data indicating that the environment of the vehicle is sub-optimal for the user to walk to the parked location of the vehicle. Examples of sub-optimal conditions are noted below that may cause the controller 110 to trigger autonomous driving of the vehicle to the location of the user. For example, the sensor data 2023 may indicate that water puddles have formed around the vehicle, which makes entry difficult. As another example, the weather data 2021 can indicate that inclement weather (e.g., rainy, ice storm, snowing, very cold, very hot, etc.) is present at the location at which the vehicle is located (based on an output of the location subsystem 154). As a further example, the crime information 2024 can indicate that the user and/or the vehicle is in a high crime area, and walking to the vehicle can pass through an unsafe neighborhood. As yet another example, location data of the vehicle (based on an output of the location subsystem 154) and location data of the user (based on coordinates acquired by a smartphone or smartwatch on the user) may indicate that there is a large distance between the user and the vehicle, which would make it difficult for the user to walk to the vehicle.

If the controller 110 has trigger the autonomous driving system 118 to move the vehicle from a current location of the vehicle to the user's location, then another vehicle preparation action that can be taken can include a user alert action 2042 to alert the user that the vehicle is being driven to the user. The alert can be in the form of a text message, an email, or another form of a notification on the user's smartphone, smartwatch, or other electronic device.

As another example, a vehicle preparation action can include a window/sunroof opening action 2043 that opens a window 134 and/or sunroof 146 of the vehicle to cool an interior space of the vehicle in response to the received data (e.g., temperature data in the sensor data 2023) indicating that the interior of the vehicle has an elevated temperature.

In some examples, prior to opening the window 134 and/or the sunroof 146, the controller 110 can determine, based on data from a sensor of the vehicle or data from a source external of the vehicle, whether it is safe to open the window or the sunroof. For example, the weather data 2021 can indicate that it is raining or snowing at the location of the vehicle, in which case it would be undesirable to open the window 134 and/or the sunroof 146. As another example, the crime information 2024 can indicate that the vehicle is in an unsafe neighborhood, in which case it would be undesirable to open the window 134 and/or the sunroof 146.

In further examples, a vehicle preparation action includes a windshield heating action 2044 defrosting a windshield of the vehicle. For example, the sensor data 2023 can indicate that snow or ice is covering a windshield (front and/or rear windshield) of the vehicle. In response, the controller 110 can trigger the windshield heating action 2044 to defrost the windshield.

In other examples, a vehicle preparation action includes a vehicle shaking action 2045 in response to the sensor data 2023 indicating that snow, ice, mud, or another layer is covering a windshield and/or window of the vehicle. The controller 110 can activate the vibrator 1441 in the suspension subsystem 144 of the vehicle to shake the vehicle so that the snow, ice, mud, or other layer can fall off.

In other examples, a vehicle preparation can include a habit-based vehicle preparation action 2046 that is based on a driving habit of the user as represented by the driver habit information 152. Based on the information of the driving habit, the controller 110 can initiate the habit-based vehicle preparation action 2046 by actuating a further adjustable component of the vehicle. For example, the habit-based vehicle preparation action 2046 can include preparing the rear seat 148 of the vehicle, such as for receiving a child seat. The driver habit information 152 can indicate that the user drives his or her small child to school every weekday morning. The habit-based vehicle preparation action 2046 can be based on a current time and date, and if the current time and date falls within a time window when the user typically drives his or her small child to school, then the controller 110 can prepare the rear seat to accept a child seat, such as by extending buckles to attach to the child seat. Further, the habit-based vehicle preparation action 2046 can include other children-in-vehicle preparation actions. For example, the other "children-in-vehicle" preparation actions can include any or some combination of the following: (1) automatic engagement of access to a third row of seats in a vehicle such as a sport utility vehicle (SUV) where one of the middle seats has to be folded in order to access the third row of seats; (2) where there is a rear entertainment module present in the vehicle, employ an automatic turn-on-and-continue-from-last position mode when the controller 110 detects children being in the vehicle, and turn off the rear entertainment module when the controller 110 detects no children are in the vehicle; (3) automatic engagement of wireless headphones for the rear entertainment module based on detection of children in the vehicle; and so forth.

More generally, similar or additional habit-based vehicle preparation actions 2046 can be performed in response to detecting other types of passenger(s) in the vehicle.

As another example, the driver habit information 152 can indicate that the user drives to a home improvement retail store every Saturday morning to purchase items for home improvement projects. The habit-based vehicle preparation action 2046 can be based on a current time and date, and if the current time and date falls within a time window when the user typically drives to the home improvement retail store, then the controller 110 can fold down the rear seat to increase the cargo space of the vehicle.

As further examples, the vehicle preparation action can include a legal/regulatory vehicle preparation action 2047 that is based on the legal and regulatory data 2026. For example, the legal/regulatory vehicle preparation action 2047 can disable or limit an operation of the vehicle if the legal and regulatory data 2026 indicates that the vehicle is not covered by insurance or is stolen or is in a region with a low speed limit. Limiting the operation of the vehicle can include restricting movement of the vehicle to certain geographic regions, such as between the home and office of the user, or setting a cap on the speed at which the vehicle can be driven, and so forth.

Figure 3:
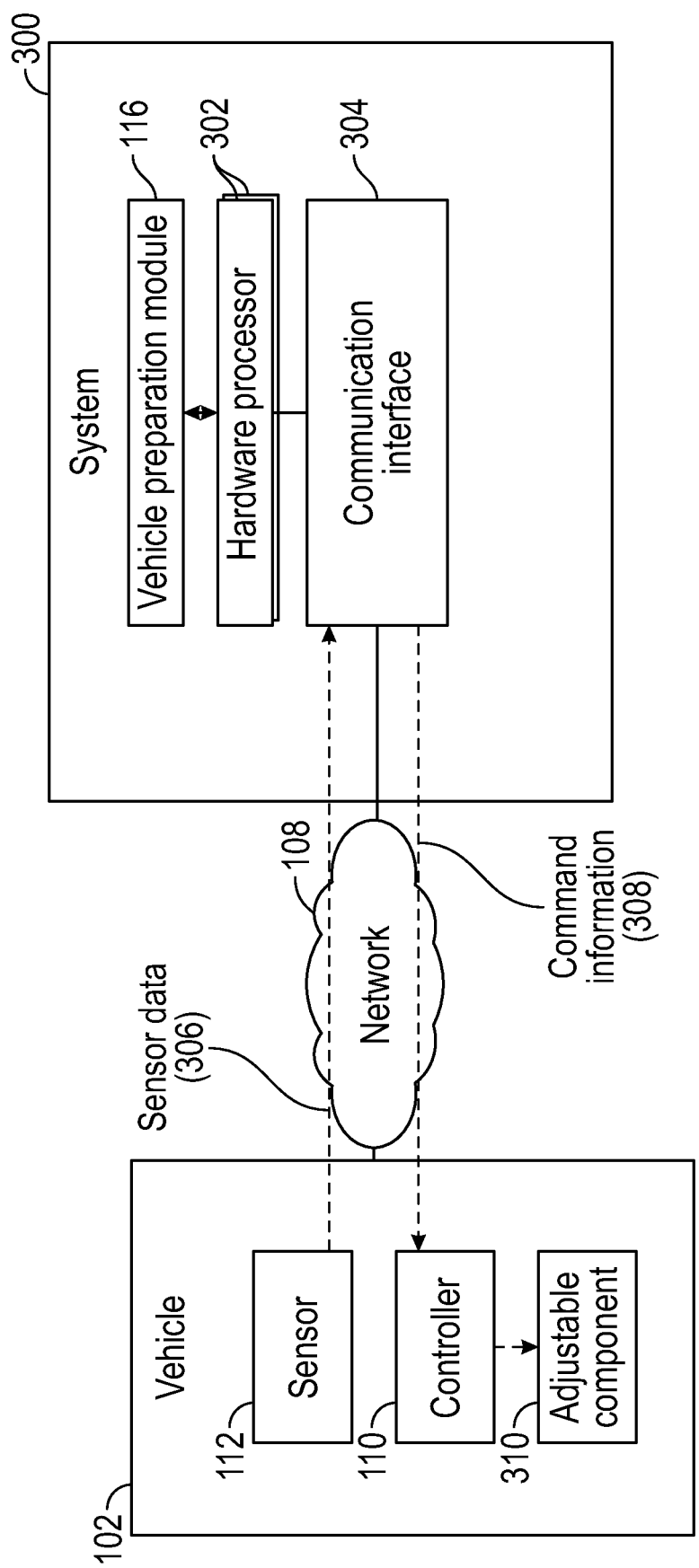
FIG. 3 is a block diagram of a system according to some examples.

FIG. 3 is a block diagram of a system 300 according to some examples that is coupled to the vehicle 102 over the network 108. The system 300 can include the cloud platform 104 or another computer system. FIG. 3 shows an example where the vehicle preparation module 116 is provided externally of the vehicle 102. From the perspective of the vehicle 102, the system 300 is a remote control system.

The system 300 includes one or more hardware processors 302. A hardware processor can include a microprocessor, a core of a multi-core microprocessor, a microcontroller, a programmable integrated circuit, a programmable gate array, or another hardware processing circuit.

The system 300 includes a communication interface 304 to communicate with the vehicle 102, such as over the network 108. The communication interface 304 can receive sensor data 306 of a vehicle sensor (e.g., 112 in FIG. 1) transmitted by the vehicle 102 to the system 300.

The vehicle preparation module 116 is executable on the one or more hardware processors 302 to transmit command information 308 to the vehicle 102, where the command information 308 is based on at least the sensor data 306 received from the vehicle 102. The command information 308 can be in the form of messages, information elements, and so forth.

In response to the command information, the controller 110 in the vehicle 102 performs a vehicle preparation action by actuating an adjustable component 310 (such as any of the adjustable components discussed in connection with FIG. 1) of the vehicle, the vehicle preparation action being performed to ready the vehicle for a user prior to operation of the vehicle.

A non-transitory machine-readable or compute-readable storage medium can store machine-readable instructions, such as those of the vehicle preparation module 116. The storage medium can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
    receive data relating to an environment of a vehicle, the received data comprising one or more of sensor data indicating presence of water proximate the vehicle, or crime data indicating a crime statistic at a location of the vehicle;
    receive habit information of a driving habit of a driver of the vehicle, the habit information comprising time information indicating a time range and a location of the driver in the time range;
    based on the sensor data indicating the presence of water proximate the vehicle or the crime data indicating the crime statistic at the location of the vehicle, initiate a first vehicle preparation action comprising actuating an adjustable component of the vehicle that causes moving the vehicle autonomously from the location of the vehicle to a location of the driver; and
    based on the location of the driver in the time range included in the habit information and based on comparing a current time to the time range of the habit information, initiate a second vehicle preparation action comprising adjusting a seat of the vehicle, the first and second vehicle preparation actions readying the vehicle for the driver prior to operation of the vehicle by the driver.

2. The non-transitory machine-readable storage medium of claim 1, wherein the system is remote from the vehicle.

3. The non-transitory machine-readable storage medium of claim 1, wherein the adjusting of the seat comprises adjusting the seat of the driver of the vehicle.

4. The non-transitory machine-readable storage medium of claim 1, wherein the received data is from a source on a network to which the vehicle is in communication with.

5. The non-transitory machine-readable storage medium of claim 1, wherein the adjusting of the seat is based on determining that the current time falls within the time range.

6. The non-transitory machine-readable storage medium of claim 1, wherein the received data comprises information of the location of the vehicle.

7. The non-transitory machine-readable storage medium of claim 1, wherein the instructions upon execution cause the system to:

receive legal and regulatory data; and perform a further vehicle preparation action based on the legal and regulatory data.

8. The non-transitory machine-readable storage medium of claim 1, wherein the received data further comprises temperature sensor data indicating a temperature of an interior space of the vehicle, the instructions upon execution causing the system to:

in response to the temperature indicated by the temperature sensor data, determine whether to open a window or a sunroof of the vehicle based on the crime data indicating the crime statistic at the location of the vehicle.

9. The non-transitory machine-readable storage medium of claim 1, wherein the sensor data indicating the presence of water proximate the vehicle is from one or more cameras of the vehicle.

10. The non-transitory machine-readable storage medium of claim 1, wherein the instructions upon execution cause the system to:

initiate a third vehicle preparation action comprising opening a window or sunroof of the vehicle to cool an interior of the vehicle in response to the received data indicating that the interior of the vehicle has an elevated temperature.

11. The non-transitory machine-readable storage medium of claim 1, wherein the instructions upon execution cause the system to:

initiate a third vehicle preparation action comprising defrosting a windshield of the vehicle.

12. The non-transitory machine-readable storage medium of claim 1, wherein the instructions upon execution cause the system to:

initiate a third vehicle preparation action comprising shaking the vehicle by vibrating the vehicle side to side, or vibrating the vehicle front and back.

13. The non-transitory machine-readable storage medium of claim 1, wherein the instructions upon execution cause the system to:

initiate a third vehicle preparation action comprising shaking the vehicle by actuating a controllable suspension of the vehicle to vibrate the vehicle.

14. The non-transitory machine-readable storage medium of claim 1, wherein the adjusting of the seat of the vehicle based on the habit information of the driving habit of the driver comprises adjusting a rear seat of the vehicle based on determining that the current time falls within the time range.

15. The non-transitory machine-readable storage medium of claim 14, wherein the adjusting of the rear seat of the vehicle comprises folding down the rear seat of the vehicle that increases a cargo space of the vehicle for the location of the driver in the time range.

16. A vehicle comprising:

a sensor;

a communication interface to communicate with a remote control system, wherein the communication interface is to send sensor data from the sensor to the remote control system, the sensor data indicating presence of water proximate the vehicle; and a controller configured to:

receive command information from the remote control system, the command information based on at least:

the sensor data indicating the presence of water proximate the vehicle, and habit information of a driving habit of a driver of the vehicle, the habit information comprising time information indicating a time range and a typical location of the driver in the time range; and in response to the command information:

perform a first vehicle preparation action comprising actuating an adjustable component of the vehicle that causes moving the vehicle autonomously away from the water to a location of the driver, and perform a second vehicle preparation action comprising adjusting a rear seat of the vehicle based on the typical location of the driver in the time range included in the habit information and based on comparing a current time to the time range of the habit information, wherein the first and second vehicle preparation actions ready the vehicle for the driver prior to operation of the vehicle by the driver.

17. A method of a system comprising a hardware processor, comprising:

receiving sensor data from a sensor of a vehicle, the sensor data indicating presence of water proximate the vehicle;

receiving web-based data regarding an environment of the vehicle, the web-based data comprising crime data indicating a crime statistic at a location of the vehicle;

receiving habit information of a driving habit of a driver of the vehicle, the habit information comprising time information indicating a time range and a typical location of the driver in the time range;

based on the sensor data indicating the presence of water proximate the vehicle and the web-based data indicating the crime statistic at the location of the vehicle, initiating, by the system, a first vehicle preparation action by actuating an adjustable component of the vehicle that causes moving the vehicle autonomously from the location of the vehicle to a location of the driver of the vehicle; and based on the typical location of the driver in the time range included in the habit information and based on comparing a current time to the time range of the habit information, initiating, by the system, a second vehicle preparation action comprising adjusting a seat of the vehicle, the first and second vehicle preparation actions readying the vehicle for the driver prior to operation of the vehicle by the driver.

18. The vehicle of claim 16, wherein the adjusting of the rear seat of the vehicle comprises folding down the rear seat that increases a cargo space of the vehicle for the typical location of the driver in the time range.

19. The method of claim 17, wherein adjusting the seat of the vehicle comprises adjusting a rear seat of the vehicle that increases a cargo space of the vehicle for the typical location of the driver in the time range.

20. The non-transitory machine-readable storage medium of claim 1, wherein the adjusting of the seat of the vehicle based on the habit information of the driving habit of the driver comprises extending a buckle that attaches to a child seat.

* * * * *